(12) United States Patent
Wang et al.

(10) Patent No.: US 8,412,665 B2
(45) Date of Patent: Apr. 2, 2013

(54) ACTION PREDICTION AND IDENTIFICATION TEMPORAL USER BEHAVIOR

(75) Inventors: Gang Wang, Beijing (CN); Weizhu Chen, Beijing (CN); Zheng Chen, Beijing (CN); Zhikai Fan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 279 days.

(21) Appl. No.: 12/947,871

(22) Filed: Nov. 17, 2010

(65) Prior Publication Data

US 2012/0123993 A1   May 17, 2012

(51) Int. Cl.
*G06F 9/44* (2006.01)
*G06N 7/02* (2006.01)
*G06N 7/06* (2006.01)

(52) U.S. Cl. .......................................... 706/52
(58) Field of Classification Search ...................... 706/52
See application file for complete search history.

(56) References Cited

U.S. PATENT DOCUMENTS

| | | | | |
|---|---|---|---|---|
| 6,659,344 | B2 * | 12/2003 | Otto et al. | 235/381 |
| 6,904,408 | B1 * | 6/2005 | McCarthy et al. | 705/2 |
| 7,003,476 | B1 * | 2/2006 | Samra et al. | 705/7.28 |
| 7,006,979 | B1 * | 2/2006 | Samra et al. | 705/7.28 |
| 7,010,495 | B1 * | 3/2006 | Samra et al. | 705/14.41 |
| 7,330,721 | B2 * | 2/2008 | Bhatia et al. | 455/422.1 |
| 7,436,311 | B2 * | 10/2008 | Rapaport et al. | 340/573.1 |
| 7,668,821 | B1 * | 2/2010 | Donsbach et al. | 707/765 |
| 7,720,723 | B2 * | 5/2010 | Dicker et al. | 705/26.8 |
| 7,822,745 | B2 * | 10/2010 | Fayyad et al. | 707/732 |
| 7,930,391 | B1 * | 4/2011 | Holt | 709/224 |
| 7,958,228 | B2 * | 6/2011 | Riise et al. | 709/224 |
| 8,027,864 | B2 * | 9/2011 | Gilbert | 705/7.31 |
| 8,027,865 | B2 * | 9/2011 | Gilbert | 705/7.31 |
| 8,032,405 | B2 * | 10/2011 | Gilbert | 705/7.31 |
| 8,069,225 | B2 * | 11/2011 | McCanne et al. | 709/219 |
| 8,122,020 | B1 * | 2/2012 | Donsbach et al. | 707/732 |
| 8,176,186 | B2 * | 5/2012 | McCanne et al. | 709/228 |
| 8,280,833 | B2 * | 10/2012 | Miltonberger | 706/45 |
| 8,301,623 | B2 * | 10/2012 | Chakrabarti et al. | 707/723 |
| 2006/0212350 | A1 | 9/2006 | Ellis et al. | |
| 2008/0004884 | A1 | 1/2008 | Flake et al. | |
| 2010/0094878 | A1 | 4/2010 | Soroca et al. | |
| 2010/0131443 | A1 | 5/2010 | Agarwal et al. | |
| 2010/0179856 | A1 | 7/2010 | Paretti et al. | |

OTHER PUBLICATIONS

Cheng et al., "Personalized Click Prediction in Sponsored Search", WDSM 2010, Feb. 4-6, 2010, ACM, pp.#351-pp.#359.
Koren, "Collaborative Filtering with Temporal Dynamics", KDD 2009, Jun. 28- Jul. 1, 2009, Paris, France, ACM, pp.#447-pp.#455US.
Tseng et al., "Efficient Mining and prediction of user behavior patters in mobile web systems", Science Direct, Infomation and Software Technology 48, 2006, pp.#357-pp.#369.

* cited by examiner

*Primary Examiner* — Michael B Holmes
(74) *Attorney, Agent, or Firm* — Lee & Hayes, PLLC (57) ABSTRACT

User behavior modeling can include determining temporal- or time-based actions performed by various users. From the mined temporal-based user actions, future actions can be predicted. Certain implementations include providing information and/or services based on the predicted future actions. Some implementations, include providing relevant information, services, and/or goods regarding the predicted future action.

20 Claims, 7 Drawing Sheets

ACTION PREDICTION AND IDENTIFICATION TEMPORAL USER BEHAVIOR

BACKGROUND

The world wide web (WWW) presents many commercial opportunities by presenting information to users to purchase goods and/or services. Tracking user behaviors or trends allows for such opportunities, and predicting a user's future actions can provide greater opportunities to relevant information.

Behavioral targeting uses information collected based on an individual user's online behavior. Such information can include web pages/websites the user has visited, or search queries the user has performed. In particular, such web pages/websites are selected to provide services and content to the individual user. It is desirable to build user behavior models that understand and differentiate between users.

There can be many benefits and uses of data gathered from a user behavior model. For example, if an advertiser understands which user will likely purchase its product, the advertiser can design a more focused advertisement campaign to target relevant users. As another example, if a content publisher knows what a user is going to be interested in the near future, the content publisher can recommend the appropriate web pages to satisfy the user's information need. As yet another example, if a search engine captures the user's online intent in advance, the search engine can not only address the user's search need, but can also facilitate and simplify the user's activities related to their current needs.

Traditional approaches may investigate on short-term, immediate or aggregated user behaviors, where user behaviors occurring at different times are aggregated together. Therefore, temporal information is lacking as to user behavior. If a user's future action can be predicted and identified in time or in advance, not only can the user's current need be satisfied, but the user's future online activities can be facilitated and simplified.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations herein provide techniques for determining users' online behavior, and modeling such behaviors to determine future actions that the users may perform. In certain implementations, predicted and identified future actions are provided to parties that can provide information, such as online advertising related to the future actions, to the users.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

The techniques described herein are generally directed towards techniques for predicting users' online actions based on when the actions occur, including modeling users' behaviors and predicting future actions of users. In certain implementations, the predicted actions can be used to provide relevant information, such as advertisements, to particular users. Some implementations make use of two phases, a phase that gathers users from a general population of users, based on a common predicted action. The second phase includes identifying, from the gathered users, users that have completed the predicted action.

Behavior Model

A user behavior model considers several concepts. The concept of "behavior representation" is considered. In order to understand temporal user behaviors, behavior representation considers both the user behavior and the time the user behavior occurred. For example, an online user behavior can be characterized by issued queries by the user and uniform resource locators (URLs) browsed by the user. The scale of queries and/or URLs can be relatively large, and when time is considered with these user behaviors, the scale of the behavior representation can become even larger. To address this issue, a data scale is considered for short term user behavior representation, which is relatively small.

User behavior can show great "behavior diversity," which is another concept to consider in behavior modeling. For example, a user often may have researched different product types, and compared price among several service providers. In certain cases, some users are price-insensitive and make a purchase decision more quickly than other users. Certain users may be particularly interested in reviews of the product/service before making a purchase. Therefore, behavior modeling may benefit from understanding the concept of behavior diversity, which is different than the traditional classification problem of distinguishing two classes of stationary samples. In order to address behavior diversity, a behavior model can capture users at different pre-action stages.

Behavior modeling may further consider the concept of "supervised knowledge". It can be difficult and costly to figure out whether a user has performed an action or not, and it is a great challenge to classify large quantities of users without human judgment. Therefore, instead of gathering a large number of users, a much smaller set of seed users that have performed the action can be initially gathered.

As discussed below, a behavior model provides a temporal user behavior representation definition. Also further discussed below, an ensemble approach understands the diversity in user behaviors, where individual classifiers in the ensemble understand a specific behavior pattern before the action. In the ensemble approach, the behavior model provides a family (ensemble) of models where each individual model understands a specific behavior pattern before the action. Each model can receive the behavior and contribute its local visibility to identify whether the user will perform the action. The ensemble approach integrates the outputs from the family of models, and makes the global prediction.

Because a behavior database or behavior log can involve relatively large amounts of data, discriminative entities (e.g., user queries made, URLs visited, etc.) are identified for behavior representation. Therefore, a discriminative entity selection method can be provided to determine the importance of each entity for predicting the action. After selecting the most discriminative entities, models can be built by the ensemble method, and users may be classified.

One goal or aim of the described techniques is to predict a particular action that a user will perform. The particular action can be denoted by the term $\mathcal{A}$. Users that have performed the action $\mathcal{A}$ in the past are defined as "positive users." Initially, some of these positive users can be collected. In certain implementations, "seed patterns" can be manually observed in order to identify such positive users from a general population of users. In order to minimize or eliminate the use of "supervised knowledge", the collecting of the positive users from the general population is performed using a minimum sample. The number of positive users that are captured using the seed patterns may be much less than the total number of positive users of the general population.

For example, the general population of users can be represented by log data. Two types of users can be extracted from the log data. One type of user is defined by a user set $U_{patt}$ which includes positive users who performed the action $\mathcal{A}$ in their history, and are also captured by the seed patterns. Another type of user is defined by the user set $U_{rand}$ which includes users randomly sampled from the log data. A group of users represented by the term U is the following equation $$U = U_{patt} \cup U_{rand}. \quad (1)$$

The total number of users is $$N = |U| \quad (2)$$

The number of users identified by the seed patterns is $$n_{patt} = |U_{patt}| \quad (3)$$

The number of randomly sampled users is $$n_{rand} = |U_{rand}| \quad (4)$$

The user set $U_{rand}$ can include positive users that are not identified due to lack of supervised knowledge. However, it can be assumed that the proportion of the positive users in $U_{patt}$ is significantly different to that of the positive users in $U_{rand}$.

User behavior can be characterized by a set of entities, $\epsilon = \{e_1, e_2, \ldots, e_m\}$, where, for example, each entity ($e_i$) can be a webpage the user visits, a query that the user issues, or a web service the user uses. The size of the entity space, m, can become relatively large, in order to characterize as many online behaviors as possible.

For each entity $e \in \epsilon$, the user set can be defined by the following equation.

$$U_e = \{u | \text{the user } u \text{ visits the entry } e, u \in U\} \quad (5)$$

Therefore, the users in the set $U_e$ are those users who visited the entity e, and the visit is recorded in the history of the user. The number of such users is defined as $$n_e = |U_e| \quad (6)$$

Figure 1:
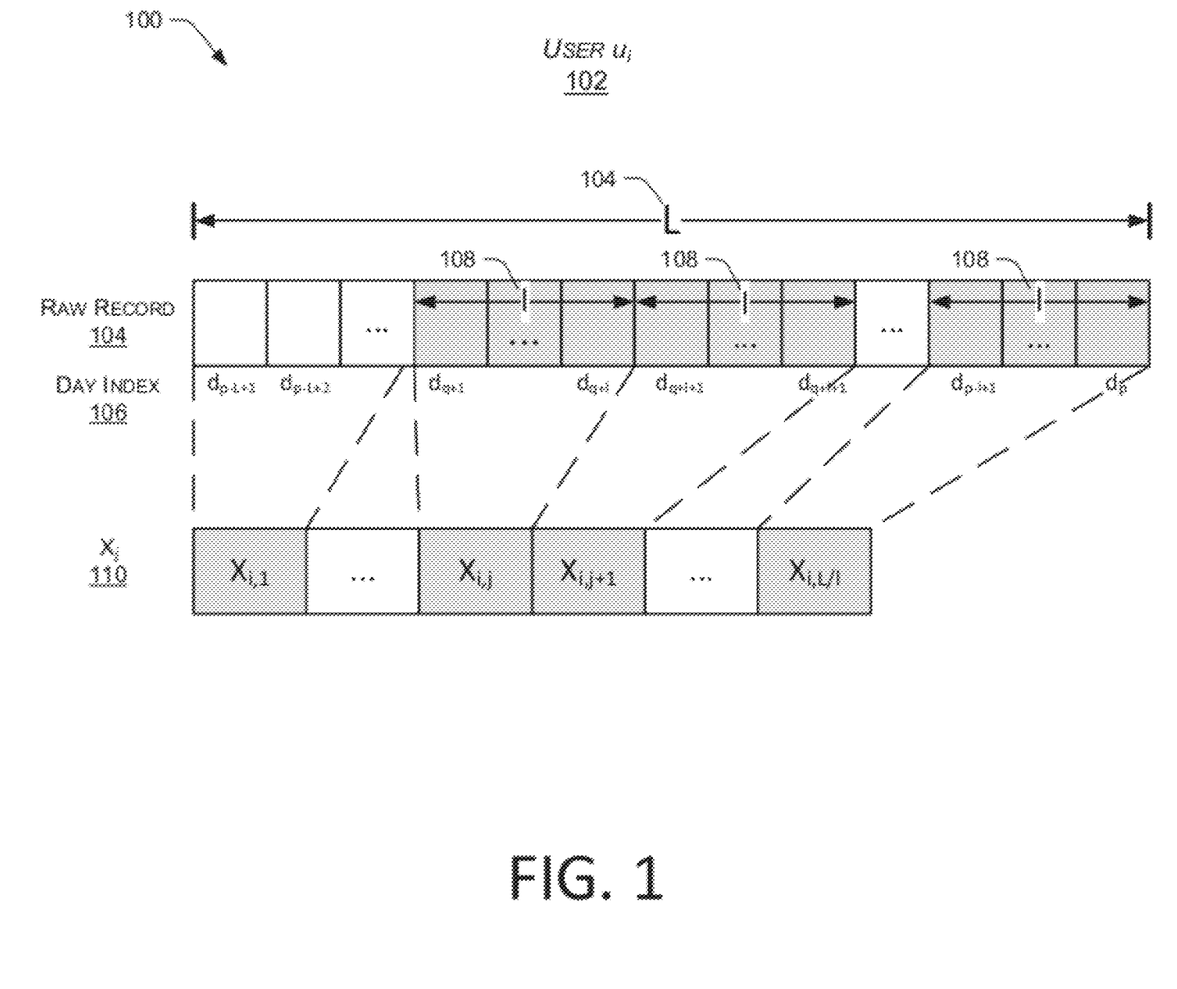
FIG. 1 is a block diagram of that represents indexing a user behavior representation to a particular user according to some implementations.

FIG. 1 shows a block diagram 100 that indexes a particular user $u_i$ 102. The block diagram particularly represents user behavior of the user $u_i$ 102. The user is part of the user set $U_{patt}$. The action of user $u_i$ 102 is associated with a unique timestamp indicating the time this action happened. The timestamp is included in raw record 104. The action timestamp of the raw record 104 is aligned to a timeline coordinate at a zero point. Therefore, in general, the history of a positive user $u \in U_{patt}$ can be represented as $(d_{p1}, \ldots, d_{-1}, d_0, d_1, \ldots, d_{p2})$, where $d_i$ is a day index 110 of the behavior history, $d_{p1}$ and $d_{p2}$ are the starting and ending points of the history, and $d_0$ is the day the action happened. Behavior history can be represented by $h_p^L$, and defined by the following equation (2), where the term L or L 106 of block diagram 100 is the L-days history ending with the day $d_p$. The day $d_0$ is excluded if $p \geq 0$. On the other hand, for the user in $U_{rand}$, $h_p^L$ represents the L-days history where the ending index p is randomly set up, since there is no associated action.

$$h_p^L \begin{cases} (d_{p-L}, \ldots, d_{-1}, d_1, \ldots, d_{p-1}, d_p) & p \geq 0 \\ (d_{p-L+1}, \ldots, d_{p-1}, d_p) & p < 0 \end{cases} \quad (7)$$

The equation $x_i(h_p^L, l) = [x_{i,1}, x_{i,2}, \ldots]$ defines the behavior representation in the history $h_p^L$, where $x_{i,j}$ is the behavior representation aggregated from l days, where l is represented by l 108 of raw record 104 in FIG. 1. The index x, 110 represents the behavior of user $u_i$ 102.

From FIG. 1 and the equations and terms discussed above, the following can be determined or defined. A vector $x_{i,j} \in \mathbb{R}^m$ is an m-length vector whose element takes either a binary or real value indicating whether or how frequently the user visits an entity in $\epsilon$. The l value 108 can be "1" to a positive number, and indicates the degree of the freedom of the behavior representation. If l 108 takes a relatively very large value, behaviors are aggregated and the temporal information is lost; however, when $h_p^L$ and l are fixed, the behavior representation of a user can be uniquely determined. Therefore, the notation $x_i(h_p^L, l)$ is used to represent user behavior.

A condition can be set that for a user in $U_{patt}$, online behaviors on the day $d_0$ are excluded from the behavior representation. The condition further excludes the possibility that there is a pattern on the day $d_0$ by which the action can be easily identified. It can appear that the action is an offline happened action. Therefore, the above algorithms can be directly applied to predict offline actions as soon as there is a set of positive users.

Action Prediction

The following is an example of a user and user actions that can be considered for a particular behavior. This example is discussed to illustrate temporal user behavior modeling. Consider, in this example, a user that has issued queries such as "wedding decorations" and "party supplies." In addition, consider that several months before the same user has issued queries such as "romantic quotes" and "love poems". From the observation of this user's history behaviors, there may be a high probability that the next actions may be planning for a "honeymoon vacation" after some time.

If it is observed, that the same user is inputting queries related to a travel location and attractions, a prediction can be made that this user is most probably planning for honeymoon travel. Therefore, there can be an opportunity not only for advertisers to provide airline ticket and hotel advertisements, but also for other service providers to provide travel accommodations, including booking the hotel and flight, finding romantic tourist attractions, etc.

The users' actions or queries are a general concept, where an action can be online or offline. Examples of online actions include "buy a product", "download software", "play online games", etc. Examples of offline actions "buy a property", "go to a restaurant", "repair a car", "have a wedding", etc.

Figure 2:
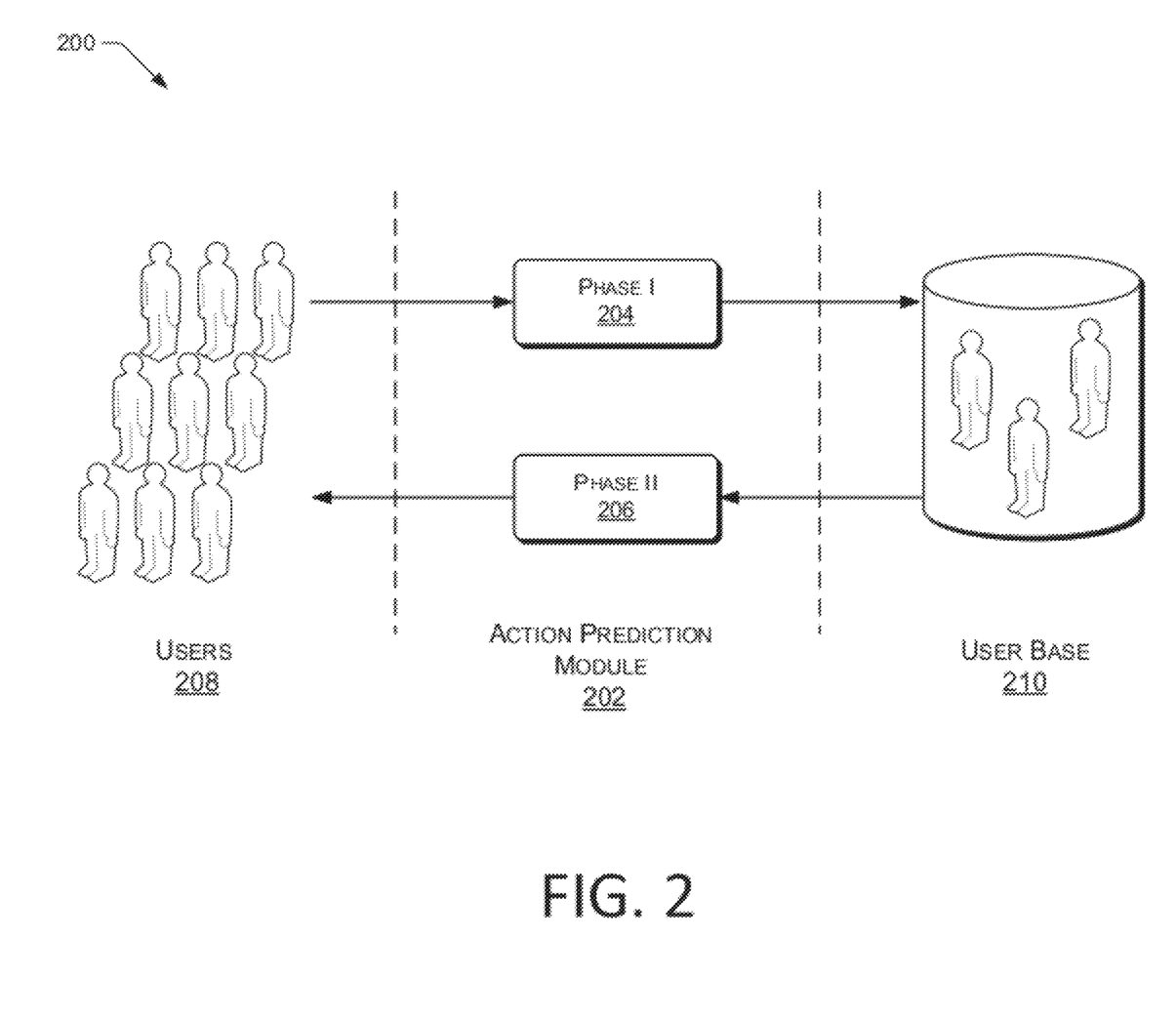
FIG. 2 is a block diagram of an example behavior targeting system according to some implementations.

FIG. 2 shows a behavior targeting system 200. In particular, workflow is shown for user action prediction. The targeting system 200 includes an action prediction module 202. The action prediction module 202 includes two phases: a phase I 206 and a phase II 208. In general, phase I 208 is directed to predicting which users from a population of "users" 208 will perform a particular behavior, and creating a "user base" 210 of such users that are expected to perform the particular behavior. In general, phase II 206 determines from the "user base" 210 which users have completed or performed the expected behavior, and remove such users from the "user base" 210, and place the users back into the population of "users" 208.

Therefore, the user base 210 stores the users who will perform the action but have not finished it. An example use of such user information is to provide the users in user base 210 to other parties who can provide relevant information, services, and/or goods related to the particular behavior or action. Such parties can include web services whose providers may have bid to provide such information, services, and/or goods. In phase I 204, the action prediction module 202 examines users 208 and collects those who will perform an action into the user base 210. It may be useful if the action prediction module 202 can capture relevant users at a very early stage.

It is not reasonable to keep delivering services to the collected users of user base 210, if some of the users have completed the action. Therefore, in phase II 206, the action prediction module 202 monitors each user in the user base 210 and identifies users that have performed the action. Therefore, two objectives can be met for a user behavior model. One objective is to be able to predict whether a user will perform an action in the future. A second objective is to be able to identify whether a user has finished the action. Since user behaviors can change dynamically, the action prediction module 202 can be implemented to update the user base 210 regularly.

Phase I 204 and phase II 206 in the action prediction module 202 correspond to two classification solutions. As described above, in phase I 204, the action prediction module 202 collects users who will perform an action into the user base 210. The algorithm aims to distinguishes the users in $U_{patt}$ from the users in $U_{rand}$. For the users in $U_{patt}$, the behaviors on the day $d_i (i \geq 0)$ are not taken into account and the history is $h_p^L$ where p<0. The classifier $\phi_2: \chi \to \{-1, +1\}$ receives the behaviors of a user at a period of history and predicts whether the user comes from $U_{patt}$ or $U_{rand}$, where X is denoted as the input space and $x_i \in X$. It is desirable at phase I 204, that the prediction of the behavior be performed at an early stage. Therefore, an accurate behavior prediction is attempted with relatively smaller p values.

In phase II 206, the action prediction module 202 identifies whether a user has finished the action. Accordingly, two classes of users for classification are from $U_{patt}$. The history in one class of users includes the days before the action happened, (i.e., $h_p^L$ where p<0), while the history in another class of users involves the days after the action happened (i.e., $h_p^L$ where p<0). Phase II 206 can include a classifier defined as $\phi_2: \chi \to \{-1, +1\}$ which receives behaviors of a user in $U_{patt}$ from a period of history and predicts whether or not the user has performed the action. Phase I 204 and phase II 206 are further discussed below.

Large amounts of data can be included in the behavior log or the data log. In order to manage such large amounts of data, discriminative entities are identified for behavior representation. Therefore, in certain implementations, a discriminative entity selection method can be performed to determine the importance of each entity for predicting the action $\mathcal{A}$. After selecting the most discriminative entities, the user behavior model may be built by an ensemble method described below. The ensemble method can also be applied to classify users. The ensemble method can be applied to address phase I 204 and phase II 206 user classification problems.

The discriminative entity selection can be considered as a pre-processing step, which extracts a set of entities from $\epsilon$ that is most discriminative to distinguish users in $U_{patt}$ from users in $U_{rand}$. For one implementation, an approach in order to discover which entity is most correlated with the action is to use the mutual information criterion. We define two random variables a and $b_e$ as the following:

$$a = \begin{cases} 1 & \text{if } u \in U_{patt} \\ 0 & \text{if } u \in U_{rand} \end{cases} \qquad (8)$$

$$b_e = \begin{cases} 1 & \text{if user visits the entity } e \\ 0 & \text{Otherwise.} \end{cases} \qquad (9)$$

Therefore, the probability $P(a, b_e)$ ($\forall a, b_e$) can be summarized by the following Table 1.

TABLE 1

| $P(a, b_e)$ | $b_e = 1$ | $b_e = 0$ | Sum |
|---|---|---|---|
| a = 1 | $p_e/N$ | $(n_{patt} - p_e)/N$ | $n_{patt}/N$ |
| a = 0 | $r_e/N$ | $(n_{rand} - r_e)/N$ | $n_{rand}/N$ |
| Sum | $n_e/N$ | $(N - n_e)/N$ | 1 | where $p_e$ is the number of users visiting the entity e in $U_{patt}$ and $r_e$ is the number of users visiting the entity e in $U_{rand}$, which is formally defined in the below:

$$p_e = |\{u | u \in U_e \wedge u \in U_{patt}\}| \qquad (10)$$

$$r_e = |\{u | u \in U_e \wedge u \in U_{patt}\}| \qquad (11)$$

The mutual information score is computed as $$I(a, b_e) = \sum_{a, b_e} p(a, b_e) \log \frac{p(a, b_e)}{p(a)p(b_e)} \qquad (12)$$

An entity with a larger mutual information score indicates that it is more discriminative to differentiate users. The entities may be ranked by $I(a, b_e)$, and a selection can be made of a set of top ranked entities for behavior representation.

Ensemble Behavior Modeling: Phase I

Given a period of user behavior, it may be desirable to identify whether the behavior belongs to a typical behavior pattern(s) before a particular action. Therefore, an ensemble or family of models is provided described by $$\mathcal{M} = \{M_k\}_{k=1}^K \qquad (13)$$

where each individual model is to understand a specific behavior pattern before the action. Each model $M_k$ ($\forall k$) receives the behavior and contributes its local visibility to identify whether the user will perform the action. To simplify the notation, $P(y=1|u, M_k)$ denotes the output of the model Mk ($\forall k$). The ensemble approach integrates outputs from a family of models and makes the global prediction according to the following.

$$P(y=1|u) = \sum_{k=1}^{K} \pi_k P(y=1|u, M_k) \quad (14)$$

where $\pi_k$ is the model weight and $\Sigma_{k=1}^{K}\pi_k=1$. From the behavior log, two sets of users $U_{patt}$ and $U_{rand}$ are collected. The log-likelihood of the data can be expressed as:

$$L(\mathcal{M}) = \sum_{u \in U_{patt}} \log P(y=1|u) + \quad (15)$$

$$\sum_{u \in U_{rand}} \log P(y=-1|u) = \sum_{u \in U_{patt}} \log\left(\sum_{k=1}^{K}\pi_k P(y=1|u, M_k)\right) +$$

$$\sum_{u \in U_{rand}} \log\left(\sum_{k=1}^{K}\pi_k P(y=-1|u, M_k)\right)$$

Since the logarithm function is concave, there is the following inequality $$\log \Sigma_i \pi_i f_i \geq \Sigma_i \pi_i \cdot \log f_i \quad (16)$$

The lower bound of the log-likelihood $L(\mathcal{M})$ is derived as follows:

$$L'(M) = \sum_{u \in U_{patt}}\left(\sum_{k=1}^{K}\pi_k \log P(y=1|u, M_k)\right) + \quad (17)$$

$$\sum_{u \in U_{rand}}\left(\sum_{k=1}^{K}\pi_k \log P(y=-1|u, M_k)\right) =$$

$$\sum_{k=1}^{K}\pi_k\left(\sum_{u \in U_{patt}} P(y=1|u, M_k) + \right.$$

$$\left.\sum_{u \in U_{rand}} P(y=-1|u, M_k)\right)$$

Therefore, instead of maximizing the log-likelihood $L(\mathcal{M})$, maximizing is performed on the lower bound function $L'(\mathcal{M})$ to generate an optimal ensemble model. It can be observed that in $L'(\mathcal{M})$, models in the model family $\mathcal{M} = \{M_k\}_{k=1}^{K}$ are completely decomposed with each other so that each model can be optimized independently.

After each individual model is optimized, an optimal model weight can be obtained with the following equation $$\pi_i = \frac{\sum_{u \in U_{patt}} P(y=1|u, M_i)}{\sum_{k=1}^{K}\left(\sum_{u \in U_{patt}} P(1|u, M_k) + \sum_{u \in U_{rand}} P(-1|u, M_k)\right)} \quad (18)$$

Each model in the model family $\mathcal{M}$ is to understand a specific behavior pattern before the action happened. Different training samples can be arranged from $U_{patt}$ and $U_{rand}$ to train each individual model. The data $T_k = \{(x, y)\}$ for training the model $M_k$ can be arranged as follows:

$$(x, y) = \begin{cases} x(h_{pk}^L, l), p_k' < 0, & y=1, \text{ if } u \in U_{patt} \\ x(h_q^L, l), & y=-1, \text{ if } u \in U_{rand} \end{cases} \quad (19)$$

where q is randomly chosen. The length of the user history for each model is assumed to be L. For the user in $U_{patt}$, the history ending with $p_k$ is taken as the positive training samples. While for the user in $U_{rand}$, a random history with the length L is taken as the negative training samples. The history $h_q^L$ of the user in $U_{rand}$ may remain the same across different data sets $\{T_k\}$ ($\forall i$). If the model $M_k$ is trained on the data $T_k$ where $p_k = -1$, the history used in the training may immediately be before the time the action happened. Therefore, the model $M_k$ can differentiate those users who are expected to perform the action very soon from random users. In contrast, if the model $M_k$ is trained on the data where $p_k$ takes a value much less than 0, the model $M_k$ can capture users at an early stage before the action occurs. Since different models $\mathcal{M} = \{M_k\}_{k=1}^{K}$ concentrate on different behavior patterns the following equation is observed.

$$p_i \neq p_j \text{ if } M_i \neq M_j. \quad (20)$$

There can be many possible implementations, such as logistic regression, support vector machine, etc, for each individual model. In this example implementation, logistic regression method is used, and the probability $P(y|u_i, M_k)$ ($\forall k$) can be written as $$P(y|u_i, M_k) = \frac{1}{1 + emp(-y<w_k, x_i>)} \quad (21)$$

where $w_k$ is a parameter of the model $M_k$.

Equation (21) above, can be plugged into the lower bound function (17) above, and known conjugate gradient optimization methods can be applied to find the optimal parameters $\{w_k\}_{k=1}^{K}$.

When a new user becomes present, the user's most recent history with the length L can be taken as an input and the ensemble behavior model can use the formula (14) to predict whether the user will perform the action.

There may be parameters, including L, $p_k$ ($\forall k$) and I, whose values are determined before training the behavioral model. The parameter L is an application-dependent parameter, whose value depends on human prior knowledge. If a longer investigation period before the action happens is needed, such as "property purchase" or "car purchase", L can be set to a large number. However, if the decision to be made is relatively easy, such as "book purchase" or "electronic product purchase", the L value can be small. The parameter $p_k$ ($\forall k$) can be set to a sequence of numbers.

As discussed, there can be some positive users in the user set $U_{rand}$ due to the lack of supervised knowledge. In order to eliminate classifier bias introduced from these users, an optimized behavior model can be applied to filter the users in $U_{rand}$. For example, the user whose conditional probability $P(y=1|u)$ is larger than a threshold can be removed from the training set and the ensemble model will be retrained.

Ensemble Behavior Modeling: Phase II

In phase II, an objective is to differentiate the user who has finished the action from the user who will perform the action. In order to train the behavior model to achieve this, the users for classification are all collected from $U_{patt}$. The history in one class of users includes the days before the action occurred, denoted by $h_{p_k}^L$ ($p_k<0$). The history in another class of users addresses the days after the action, denoted by $h_{p_j}^L$ ($p_j>0$).

Compared with phase I, applying the ensemble approach for phase II can be more complicated. This complication occurs because there are more possible ($p_k$, $p_j$) pairs. Therefore, more individual models may be needed to differentiate user behaviors. Therefore in phase II, the ensemble or family of models is $\mathcal{M} = \{M_{kj}\}_{k=1,j=1}^{K,J}$. The ensemble approach integrates the output from each model by the following $$P(y=1\mid u) = \sum_{k=1}^{K}\sum_{j=1}^{J} \pi_{kj} P(y=1\mid u, M_{kj}) \qquad (22)$$

where $$\sum_{k=1}^{K}\sum_{j=1}^{J} \pi_{kj} = 1$$

Similar to the derivations described above regarding phase I (i.e., Ensemble Behavior Modeling: Phase I), each model in the model family of phase II can be optimized individually. For example, the model weight $\pi_{kj}$ can be optimized directly after each optimal model is produced. The data $T_{kj}$ to train the model $M_{kj}$ can be arranged as follows:

$$(x, y) = \begin{cases} x(h_{p_k}^L, l), \; p_k < 0, \;\; y=1, u \in U_{patt} \\ x(h_{p_j}^L, l), \; p_j > 0 \;\; y=-1, u \in U_{patt} \end{cases} \qquad (23)$$

When a new user becomes present, each of K×J models receives the user's behavior and identifies whether the user will perform the action based on the model's local visibility. A global decision can be made according to the formula (22) above.

Example User Interface

Figure 3:
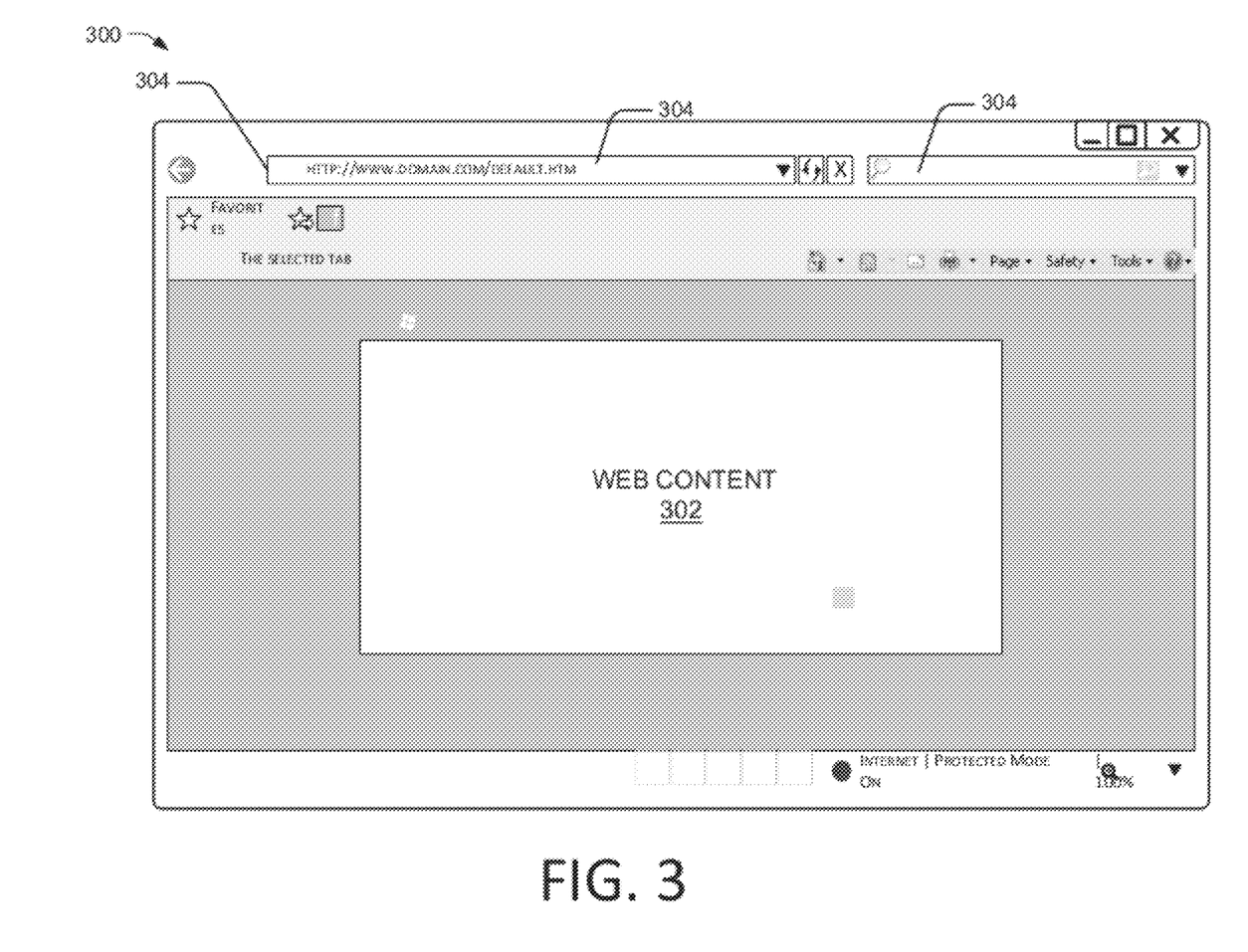
FIG. 3 is an example user interface for action prediction of user behavior according to some implementations.

FIG. 3 is an example user interface 300 for action prediction of user behavior. The user interface 300 can be configured as part of a web browser of a user computing device. The user interface 300 can provide various web content 302. In certain implementations, the web content includes a search interface, including user queries. In this implementation, the user interface includes a toolbar 304. In toolbar 304, the URL 306 is displayed of a visited website. The toolbar 304 further includes a browser search field 304. Therefore, in certain implementations toolbar 304 can be configured to provide user log data as discussed above, as to particular users and actions of such users.

Example System

Figure 4:
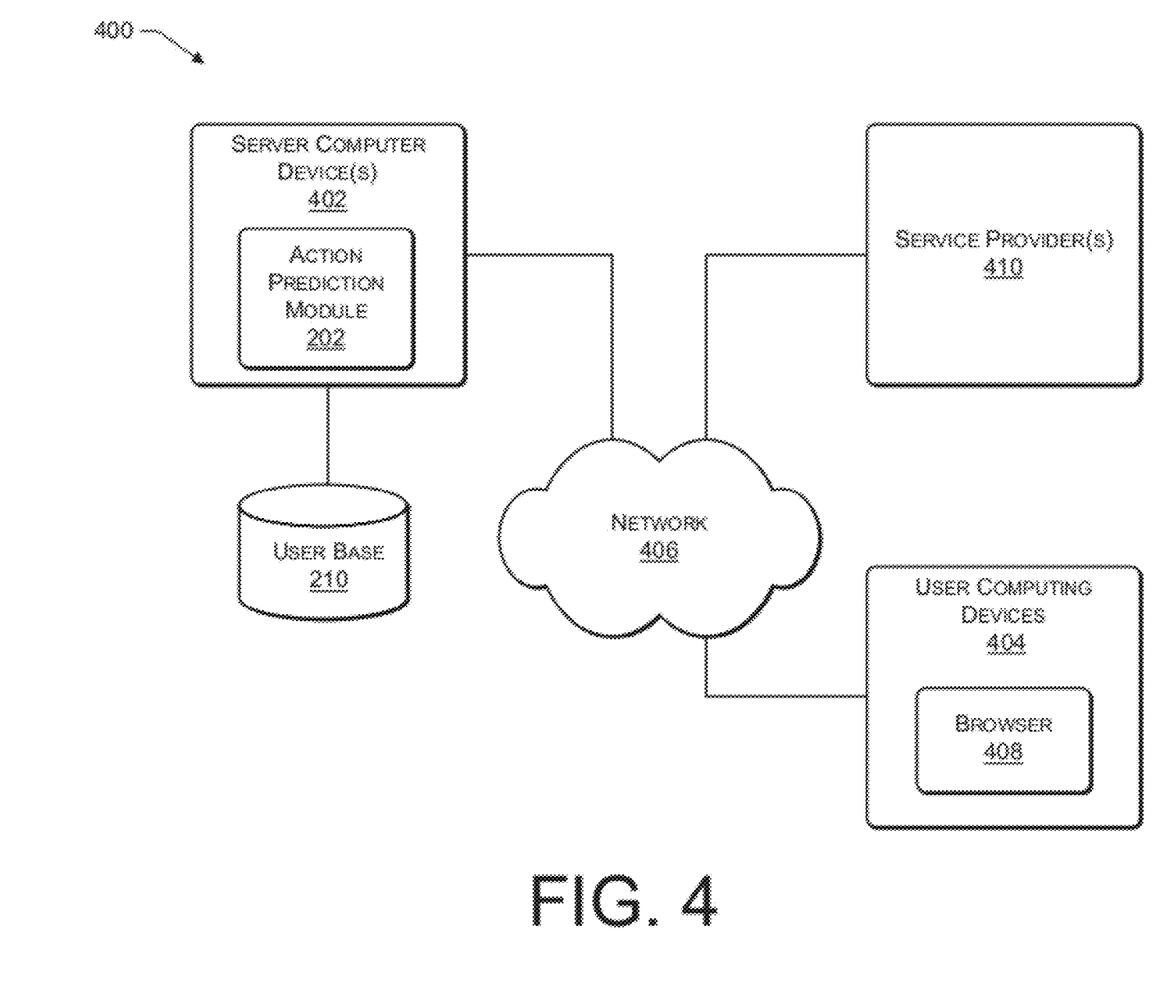
FIG. 4 is a block diagram of an example system for carrying out action prediction and identification from mining temporal user actions according to some implementations.

FIG. 4 illustrates an example of a system 400 for carrying out user action prediction according to some implementations herein. To this end, the system 400 includes one or more server computing device(s) 402 in communication with a plurality of client or user computing devices 404 through a network 406 or other communication link. In some implementations, the server computing device 402 exists as a part of a data center, server farm, or the like, and is able to serve as a component for providing a commercial search website. The system 400 can include any number of the server computing devices 402 in communication with any number of user computing devices 1304. For example, in one implementation, the network 406 includes the World Wide Web implemented on the Internet, including numerous databases, servers, personal computers (PCs), workstations, terminals, mobile devices and other computing devices spread throughout the world and able to communicate with one another. Alternatively, in another possible implementation, the network 406 can include just a single server computing device 402 in communication with one or more client devices 404 via a LAN (local area network) or a WAN (wide area network). Thus, the user computing devices 404 can be coupled to the server computing device 402 in various combinations through a wired and/or wireless network 406, including a LAN, WAN, or any other networking technology, using one or more protocols, for example, a transmission control protocol running over Internet protocol (TCP/IP), or other suitable protocols.

In some implementations, the user computing devices 404 are personal computers, workstations, terminals, mobile computing devices, PDAs (personal digital assistants), cell phones, smart phones, laptops, tablet computing devices, or other computing devices having data processing capability. The user computing devices 404 can be associated to individual users. Therefore, in some implementations, identification of users can be based on users associated with a particular user computing device 404. In other cases, for example, users can be identified by a unique login identifier to a website or service.

Furthermore, the user computing devices 404 may include a browser 408 to access various web pages/websites. In particular, the browser 408 can be configured to provide the user interface 300 described above in reference to FIG. 3. The browser 408 may be any suitable type of web browser such as Internet Explorer®, Firefox®, Chrome®, Safari®, or other type of software configured to enable submission of a query for a search.

In this implementation, the server computing device 402 includes the action prediction module 202 as discussed above. As discussed, the action prediction module can include the behavior model described above, and provide for techniques used in predicting users' behaviors based on a temporal use. The server computing device 402 accesses and can update the user base 210 as described above.

Information and data as to particular user behaviors can be provided to service provider(s) 410. As discussed above, service provider(s) 410 can include product/service merchants, advertisers, etc., and are able to provide information/services related to an anticipated user action, as stored in user base 210. The server computer device(s) 402 can control access of the user base 210 to service provider(s) 410.

Furthermore, while an example system architecture is illustrated in FIG. 4, other suitable architectures may also be used, and implementations described herein are not limited to any particular architecture. For example, in some implementations, user base 210 may be located at server computing device 402. Other variations will also be apparent to those of skill in the art in light of the disclosure herein.

Example Server Computing Device

Figure 5:
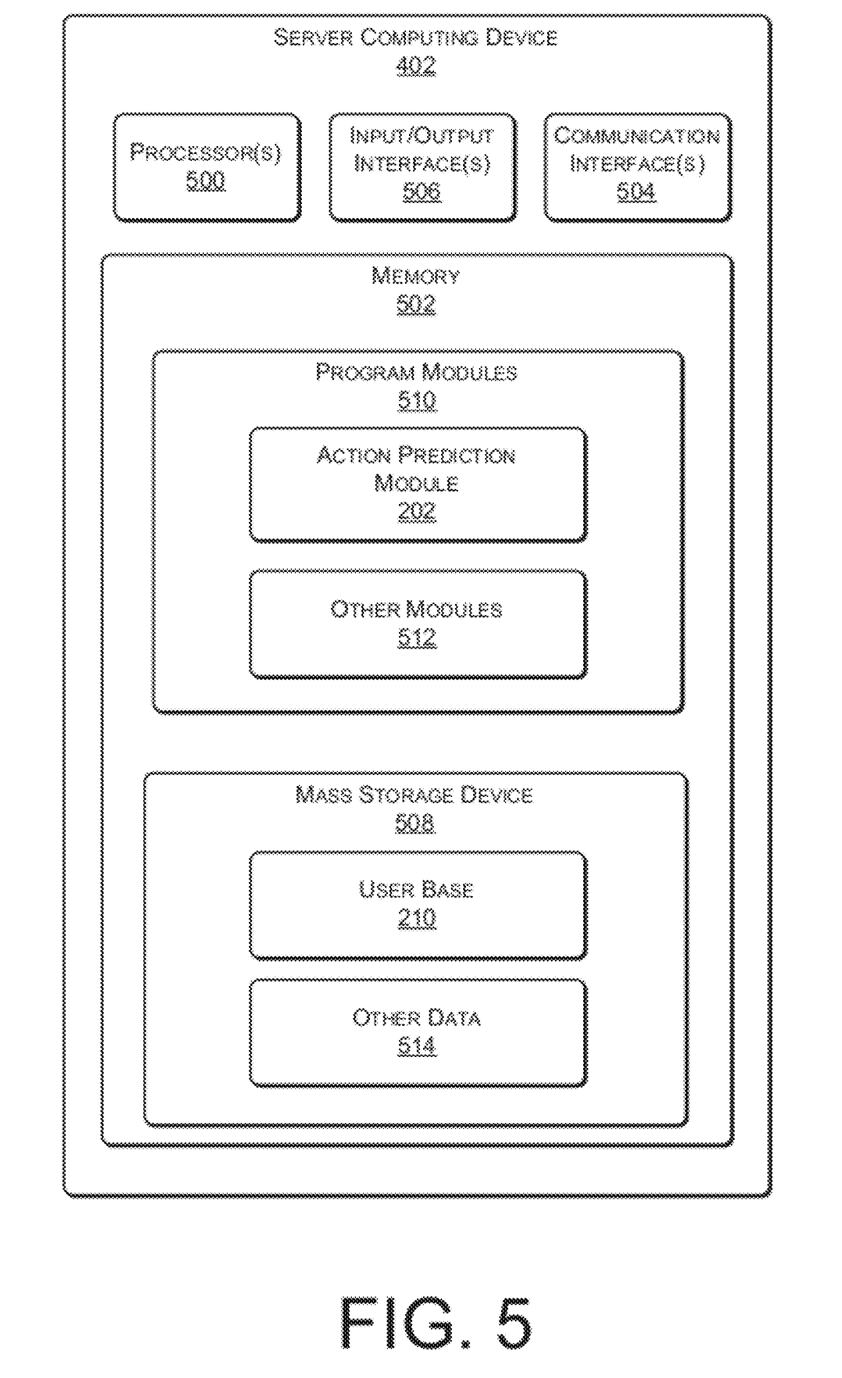
FIG. 5 is a block diagram of an example server computing device for action prediction and identification from mining temporal user actions according to some implementations.

FIG. 5 illustrates an example configuration of a suitable computing system environment for server computing device 402 according to some implementations herein. Server computing device 402 may include at least one processor 500, a memory 502, communication interfaces 504 and input/output interfaces 506.

The processor 500 may be a single processing unit or a number of processing units, all of which may include single or multiple computing units or multiple cores. The processor 500 can be implemented as one or more microprocessors, microcomputers, microcontrollers, digital signal processors, central processing units, state machines, logic circuitries, and/or any devices that manipulate signals based on operational instructions. Among other capabilities, the processor 500 can be configured to fetch and execute computer-readable instructions or processor-accessible instructions stored in the memory 502, mass storage device 508, or other computer-readable storage media.

The memory 502 is an example of computer-readable storage media for storing instructions which are executed by the processor 500 to perform the various functions described above. For example, the memory 502 may generally include both volatile memory and non-volatile memory (e.g., RAM, ROM, or the like). Further, the memory 502 may also include mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. The memory 502 is capable of storing computer-readable, processor-executable program instructions as computer program code that can be executed on the processor(s) 500 as a particular machine configured for carrying out the operations and functions described in the implementations herein.

The memory 502 may include program modules 510 and a mass storage device 508. The program modules 510 may include the action prediction module 202 and other modules 512, such as an operating system, drivers, and the like. The action prediction module 202 can be executed on the processor(s) 500 for implementing the functions described herein. In some implementations, the mass storage device 508 may include the user base 210. The mass storage device 508 may also include other data 514 for use in server operations, such as data for providing a website, and so forth.

The server computing device 402 can also include one or more communication interfaces 504 for exchanging data with other devices, such as via a network, direct connection, or the like, as discussed above. The communication interfaces 504 can facilitate communications within a wide variety of networks and protocol types, including wired networks (e.g., LAN, cable, etc.) and wireless networks (e.g., WLAN, cellular, satellite, etc.), the Internet and the like.

Example User Computing Device

Figure 6:
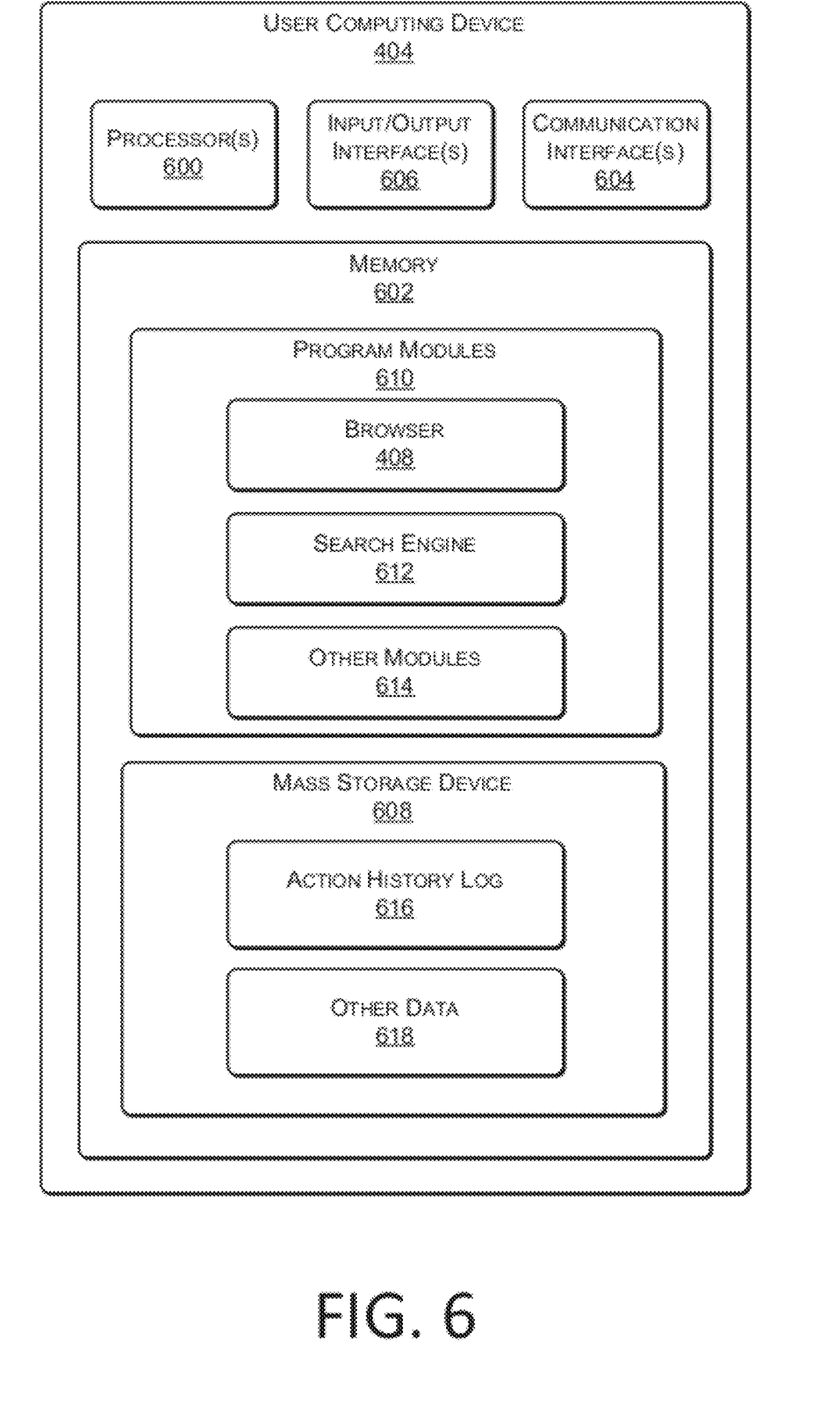
FIG. 6 is a block diagram of an example user computing device for action prediction and identification from mining temporal user actions according to some implementations.

FIG. 6 illustrates an example configuration of a suitable computing system or user computing device 404 for user action prediction according to some implementations herein. It is to be understood that although the computing device 404 is shown, in certain implementations, the computing device 404 is contemplated to be part of a larger system. Furthermore, the described components of the computing device 404 can be resident in other computing devices, server computers, and other devices as part of the larger system or network.

The computing device 404 can include at least one processor 600, a memory 602, communication interfaces 604 and input/output interfaces 606. The processor 600 may be a single processing unit or a number of processing units, all of which may include single or multiple computing units or multiple cores. The processor 600 can be implemented as one or more microprocessors, microcomputers, microcontrollers, digital signal processors, central processing units, state machines, logic circuitries, and/or any devices that manipulate signals based on operational instructions. Among other capabilities, the processor 600 can be configured to fetch and execute computer-readable instructions or processor-accessible instructions stored in the memory 602, the mass storage device 608, or other computer-readable storage media.

The memory 602 is an example of computer-readable storage media for storing instructions which are executed by the processor 600 to perform the various functions described above. For example, the memory 602 can generally include both volatile memory and non-volatile memory (e.g., RAM, ROM, or the like). Further, memory 602 may also include mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. The memory 602 is capable of storing computer-readable, processor-executable program instructions as computer program code that can be executed on the processor(s) 600 as a particular machine configured for carrying out the operations and functions described in the implementations herein.

The memory 602 may include program modules 610 and the mass storage device 608. The program modules 610 can include the above described browser 408. The program modules 610 can include a search engine 612. The program modules 610 can also include other modules 614, such as an operating system, drivers, and the like. The browser 408 and the search engine 612 can be executed on the processor(s) 600 for implementing the functions described herein. Additionally, mass storage device 608 can include an action history log 618 that stores a user's actions. The mass storage device 610 may also include other data 620 for use in server operations, such as data for providing a website, and so forth.

The communication interfaces 604 can allow for exchanging data with other devices, such as via a network, direct connection, or the like. The communication interfaces 604 can facilitate communications within a wide variety of networks and protocol types, including wired networks (e.g., LAN, cable, etc.) and wireless networks (e.g., WLAN, cellular, satellite, etc.), the Internet and the like. The input/output interfaces 606 can allow communication within user computing device 404.

Example Action Prediction Process

Figure 7:
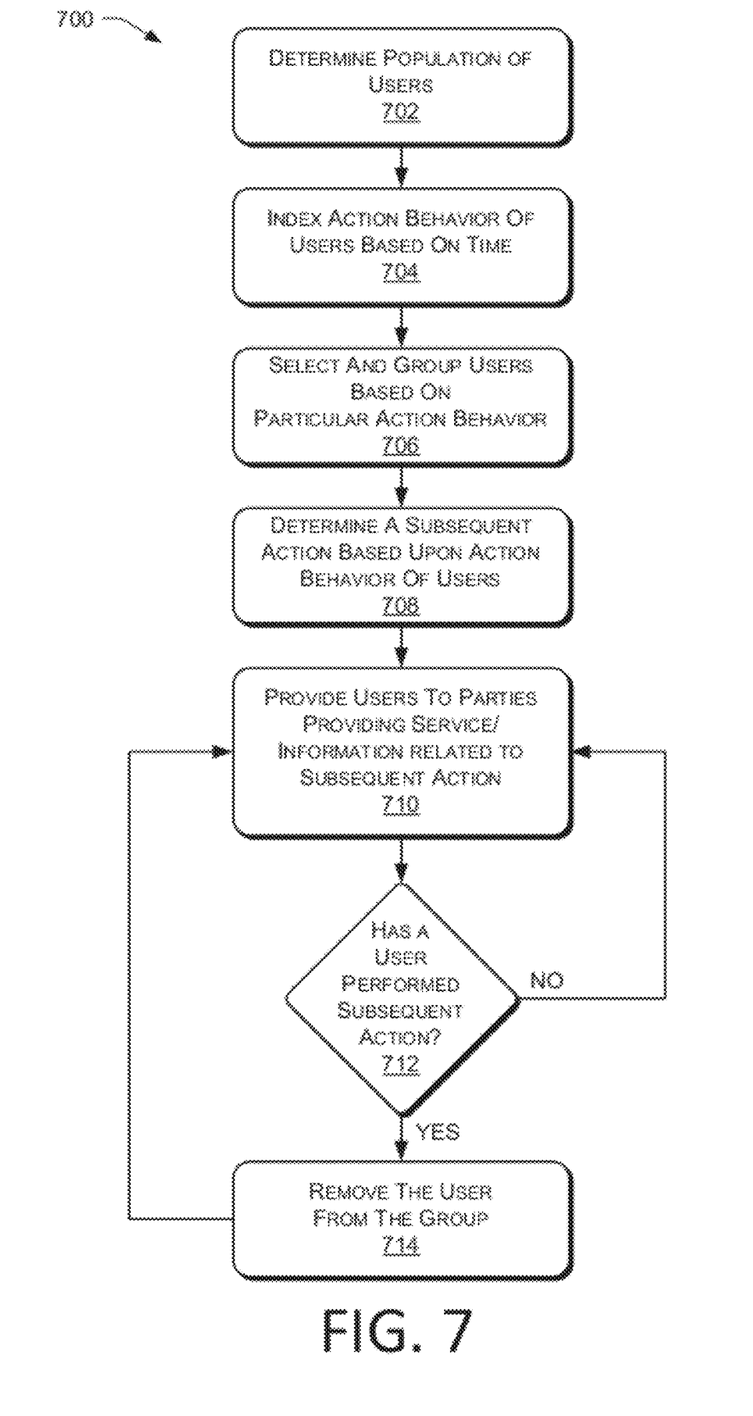
FIG. 7 is a flow diagram of an example process for action prediction and identification from mining temporal user actions according to some implementations.

FIG. 7 depicts a flow diagram of an example of an action prediction and identification from mining temporal user actions process according to some implementations herein. In the flow diagram, the operations are summarized in individual blocks. The operations may be performed in hardware, or as processor-executable instructions (software or firmware) that may be executed by one or more processors. Further, the process 700 may, but need not necessarily, be implemented using the system of FIG. 5, and the processes described above.

At block 702, a determination is made of users in a general population that have performed online or offline actions. The users can be gathered from one or more databases and/or services.

Block 704, meanwhile, represents indexing of the actions of the users in the general population. In certain implementations, the number of users that are indexed is reduced from the general population. For example, discriminative entity selection can be performed as described above. In particular, the behaviors of the user actions are indexed based on time (i.e., temporal index). Furthermore, such actions can be identified with other actions, in order to track or determine a pattern. The indexed actions can be entered into a behavior database or behavior log as described above.

A block 706 represents selecting a group of users from the general population. The selecting is based on the behavior actions, and particularly behavior actions that predict future actions. The group of users is particularly selected based on prediction that users in the group are expected to perform certain actions in the near future. The discussions in regards to phase I describe examples aspects of the selecting.

A block 708 then represents determining a particular future action. The group selected in block 706, can be narrowed to users that are expected to perform the particular action. This revised user group can be placed in a user database, such as user database 210 described above. The ensemble behavior modeling is an example of providing different models for behavior patterning, and associating the behavior pattern with a particular future action.

At block 710, information regarding the users that are determined in block 708 can be provided to parties that can provide relevant information, services, and/or goods to the users based on the expected future action to be performed.

If a user in the revised user group performs the expected action, following the YES branch of block 712, the user is removed from the group at block 714, and the group of users is updated. The updated group can be provided as described in block 710. The discussions with regard to phase II describe example aspects of the removing. Otherwise, process 700 continues, following the NO branch of block 712. The group of users is continually updated to determine if a user has performed the action, and to subsequently update the group of users. The decision block 712 provides for such updating.

CONCLUSION

Implementations herein provide a behavior model that determines users' temporal or time based online actions, and predicts future user actions based on the determined online actions. Some implementations provide grouping users based on similar determined actions, and removing users from a group if such users have performed the predicted future action.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method performed by one or more computing systems comprising:
    determining a population of users performing online actions, wherein determining the population includes indexing actions of users of the population over a particular time period;
    selecting from the population of users, a group of users that have performed particular time-based user actions that relate to a user behavior; and
    predicting a subsequent user action based at least in part upon the user behavior.

2. The method of claim 1, wherein the determining the population is based at least in part on gathering an initial number of users based on a seed pattern.

3. The method of claim 1, wherein the determining the population of users further includes determining offline actions based on online searches and website visits.

4. The method of claim 1, wherein the selecting from the population is based at least in part on an ensemble of models that include models for particular user behavior actions.

5. The method of claim 1, wherein the particular time-based user actions are characterized by a set of websites that the user has visited.

6. The method of claim 5, wherein the actions are correlated with the website.

7. The method of claim 1 further comprising updating the population of users.

8. The method of claim 1 further comprising removing, from the group of users, a user that has performed the subsequent action.

9. The method of claim 1 further comprising providing an identification of the group of users to parties that provide information associated with the subsequent action.

10. A computing device comprising:
    one or more processors;
    memory coupled to the processor and comprising an action-prediction module that is configured to cause the one or more processors to:
        select, from a population of users, a group of users that have performed particular user actions during a particular time period, wherein the user actions are associated with a behavior model; and
        determine a subsequent action based at least in part upon the particular user actions.

11. The computing device of claim 10, wherein the population of users is taken from a user log.

12. The computing device of claim 10, wherein the behavior model is part of an ensemble of behavior models.

13. The computing device of claim 10, wherein the action-prediction module is configured to select the population of users based at least in part on online actions performed by the users of the population of users.

14. The computing device of claim 10, wherein the action-prediction module is further configured to selectively provide information regarding the group of uses to parties providing information regarding the subsequent action.

15. The computing device of claim 10, wherein the action-prediction module is further configured to determine which users of the group of users have performed the subsequent action and remove, from the group, the users that have performed the subsequent action.

16. The computing device of claim 10, wherein the action-prediction module is further configured to collect actions based at least in part on data provided by respective users on a browser toolbar.

17. A computer readable storage medium having computer readable instructions for performing steps comprising:
- determining a population of online users performing particular time-based online and offline actions;
- indexing the time-based actions of the online users;
- grouping a set of users from the population of online users based at least in part on a behavior pattern of the time-based actions; and
- predicting a subsequent action based at least in part on the behavior pattern.

18. The computer readable storage medium of claim 17, wherein the determining the population of online users includes tracking users search queries and web site visits.

19. The computer readable storage medium of claim 17, wherein the determining includes checking for a new user and predicting if the new user will perform the subsequent action.

20. The computer readable storage medium of claim 17, further comprising removing users that perform the subsequent action from the set of users.

* * * * *